United States Patent [19]

Fujita et al.

[11] Patent Number: 4,995,726
[45] Date of Patent: Feb. 26, 1991

[54] SURFACE PROFILE MEASURING DEVICE UTILIZING OPTICAL HETERODYNE INTERFERENCE

[75] Inventors: Kazuhiko Fujita, Nagoya; Yoshinori Bessho, Age, both of Japan

[73] Assignee: Brother Kogyo Kabushiki Kaisha, Japan

[21] Appl. No.: 412,164

[22] Filed: Sep. 25, 1989

[30] Foreign Application Priority Data

Sep. 26, 1988 [JP] Japan .............................. 63-239941

[51] Int. Cl.$^5$ .............................................. G01B 9/02
[52] U.S. Cl. .................................... 356/349; 356/359
[58] Field of Search ............................. 356/349, 359

[56] References Cited

U.S. PATENT DOCUMENTS

4,776,699 10/1988 Yoshizumi .......................... 356/349
4,886,362 12/1989 Oono .................................. 356/349

Primary Examiner—Davis L. Willis
Assistant Examiner—Matthew W. Koren
Attorney, Agent, or Firm—Oliff & Berridge

[57] ABSTRACT

The surface profile measuring device utilizing optical heterodyne interference comprising a laser source for emitting a laser beam, an object lens for converging the laser beam on the surface of an object to be measured, the laser beam being reflected from the surface of the object while provided with information on a surface profile of the object, an optical heterodyne interference device for allowing the reflected beam to interfere with a reference beam having a frequency different from that of the reflected beam to generate beat signals having the information on the surface profile of the object, a circuit for measuring the surface profile of the object on the basis of phase variation of the beat signals, a driving device including a piezoelectric element for relatively moving one of the object lens and the object to be measured in the direction of the optical axis of the laser beam incident on the surface, and a control device for controlling the driving device on the basis of the phase difference or amplitude ratio between the beat signals so that the surface of the object is disposed substantially at a focusing position of the object lens.

8 Claims, 10 Drawing Sheets

SURFACE PROFILE MEASURING DEVICE UTILIZING OPTICAL HETERODYNE INTERFERENCE

BACKGROUND OF THE INVENTION

This invention relates to a surface profile measuring device, and more particularly to a surface profile measuring device utilizing optical heterodyne interference between two laser beams having different frequencies.

An optical heterodyne interference method has been conventionally utilized in a device for measuring a surface profile such as roughness of an object to be measured. In this method, a measuring beam outputted from a laser source is converged through an object lens on the surface of the object which is relatively movable in the direction intersecting to the optical axis of the measuring beam, and is reflected from the surface of the object while it is provided with information on the surface profile of the object. The reflected beam from the surface of the object is allowed to interfere with a reference beam having a different frequency from that of the reflected beam to form a composite beam. The composite beam is detected by an optical sensor and a measuring beat signal having information on the surface profile of the object is outputted therefrom. The surface profile of the object is measured on the basis of phase variation of the beat signal. In the conventional device for determing the surface profile, the object lens and the object to be measured are arranged so that the optical sensor provides an output signal having the largest amplitude.

However, the above conventional device for determing the surface profile of an object has a disadvantage that measurements obtained by the conventional device are not necessarily coincident with those obtained by another device adopting another principle or method, such as a device adopting a probe contact method. This method and the disadvantage thereof is described in "O plus E" published on April, 1988 by Shin Gijutsu Communications, Co., Ltd.

SUMMARY OF THE INVENTION

The applicants of this invention has made an effort to improve measuring accuracy of a surface profile measuring device utilizing optical heterodyne interference. As a result of the effort, the applicants have found that the measurements obtained by the conventional device are varied in accordance with the positional relation between an object lens and an object to be measured. That is, it has been illuminated by the applicants that a measurement becomes higher for the positional relation in which a reflected beam from the surface of the object is convergently incident to an optical sensor and becomes lower for the positional relation in which the reflected beam is divergently incident to the optical sensor, while it is approximately equal to a measurement obtained by the measuring method defined in ISO (INTERNATIONAL ORGANIZATION FOR STANDARDIZATION) for the positional relation in which the reflected beam is incident to the optical sensor while it is collimated. In the conventional surface profile measuring device utilizing optical heterodyne interference, the positional relation between the object lens and the object to be measured is adjusted so that the output signal of the optical sensor has the largest amplitude, so that the reflected beam from the surface of the object is convergently incident to the optical sensor and the measurement obtained by the device becomes lower.

An object of this invention is to eliminate the above-described difficulty accompanying the conventional surface profile measuring device and improve measuring accuracy of a surface profile measuring device.

The foregoing object of this invention has been achieved by the provision of a surface profile measuring device utilizing optical heterodyne interference comprising: a laser source for emitting a laser beam, an object lens for converging the laser beam on the surface of an object to be measured, the laser beam being reflected from the surface of the object while provided with information on a surface profile of the object, interfering means for allowing the reflected beam to interfere with a reference beam having a frequency different from that of the reflected beam to generate beat signals having the information on the surface profile of the object, surface profile measuring means for measuring the surface profile of the object on the basis of phase variation of the beat signal, driving means for moving one of the object lens and the object to be measured in the direction of the optical axis of the laser beam incident on the surface of the object relative to the other, and control means for controlling the driving means on the basis of the beat signals so that the surface of the object is disposed substantially at a focusing position of the object lens.

In the surface profile determining device thus constructed, the driving means for moving one of the object lens and the object to be measured relative to the other is controlled by the controlling means so that the surface of the object is disposed at the focusing position of the object lens. Therefore, the beam which is reflected from the surface of the object and passed through the object lens is allowed to be collimated and interfere with a collimated reference beam, so that the surface profile of the object, such as roughness, is determined with high accuracy.

The control device includes plural optical sensors provided in a plane vertical to the optical axis of a composite beam of the reflected beam and the reference beam for detecting the composite beam, and controls the driving device on the basis of the phase difference or the amplitudes of the measuring beat signals outputted from the optical sensors so that the reflected beam becomes a collimated beam.

DETAILED DESCRIPTION OF THE INVENTION

The preferred embodiments of this invention will be described with reference to the accompanying drawings.

Figure 1:
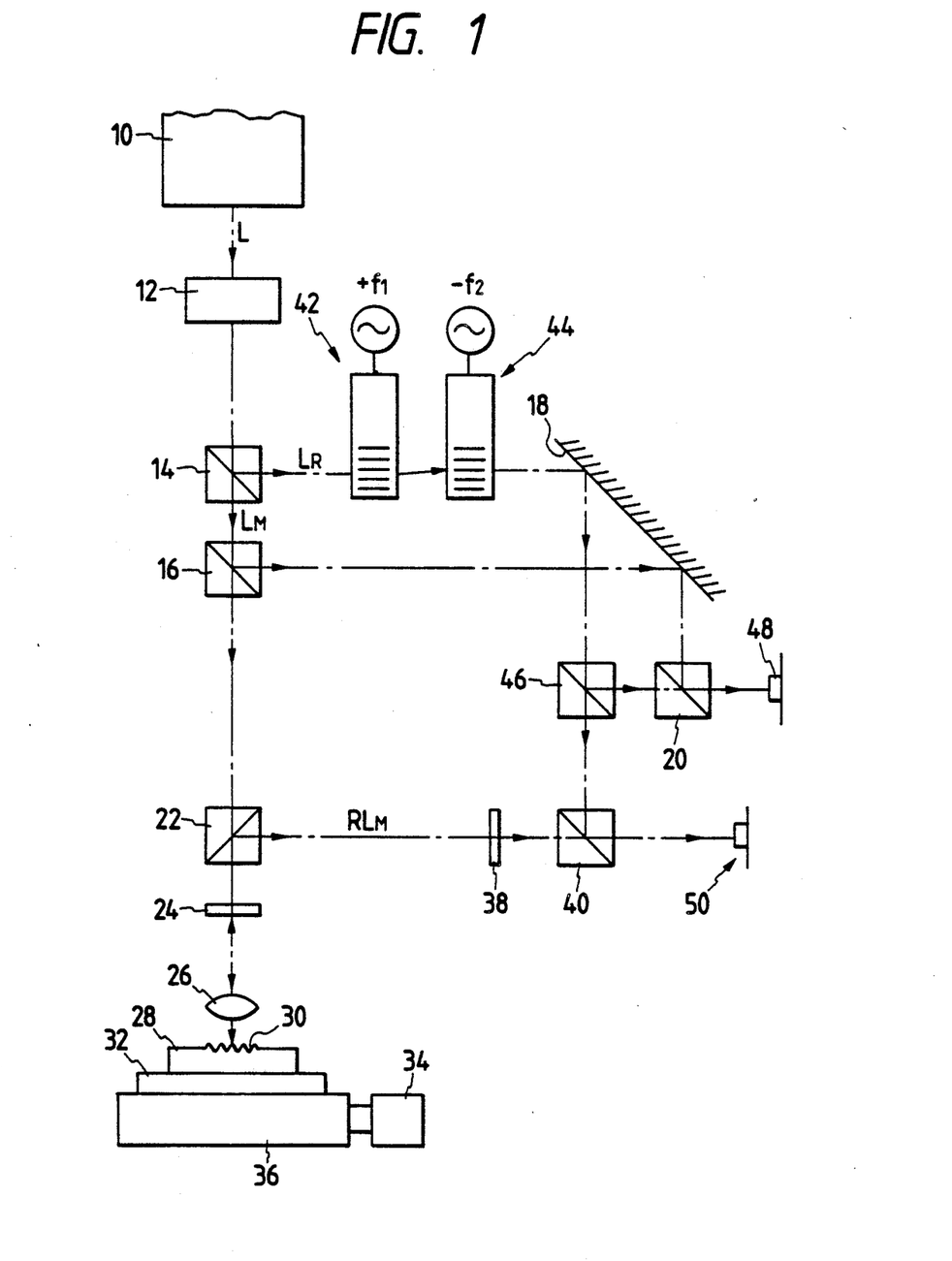
FIG. 1 shows one optical arrangement of a surface profile measuring device utilizing optical heterodyne interference according to this invention.

FIG. 1 shows one optical arrangement of the surface profile measuring device according to this invention. A linearly-polarized laser beam L having a frequency $f_0$ is outputted from a laser source 10 such as a He-Ne laser source or the like, and is applied through an isolator 12 to a NPBS (Non-Polarizing beam splitter) 14. The isolator 12 is provided between the laser source 10 and the NPBS 14 to prevent a returning light of the laser beam from being incident to the laser source 10. The laser beam incident to the NPBS 14 is split into a measuring beam $L_M$ and a reference beam $L_R$, the former passing through the NPBS 14 and the latter being reflected therefrom. The measuring beam $L_M$ passed through the NPBS 14 is further applied to another NPBS 16 and split into two beams again. One of the beams, which is reflected from the NPBS 16, is applied through a reflection mirror 18 to a NPBS 20 for the purpose of forming a reference beat signal, while the other beam, that is, the measuring beam $L_M$ passed through the NPBS 16 is applied to a PBS (Polarizing Beam Splitter) 22. The plane of polarization of the laser beam L outputted from the laser source 10 is in parallel with an incident surface of the PBS 22, that is, the laser beam L is a plane-polarized beam, so that the measuring beam $L_M$ is freely passed through the PBS 22 as it is.

The measuring beam $L_M$ passed through the PBS 22 is applied to a quarter-wave plate 24 to be converted from the plane-polarized light to the circularly polarized light, and then is focused through an object lens 26 on a prescribed region of the surface 30 of an object 28 to be measured. The object 28 is mounted on a driving device 32 including a driving source such as a piezoelectric element and is allowed to be moved in the direction of the optical axis of the measuring beam $L_M$. The driving device 32 is provided for the purpose of relatively moving the object 28 and the object lens 26 in the direction of the optical axis of the measuring beam $L_M$.

The driving device 32 is further mounted on a movable table 36 which is two-dimensionally moved in an X-Y plane vertical to the optical axis of the measuring beam $L_M$ by a moving source 34 such as a motor or the like, so that the driving device 32, that is, the object 28 is two-dimensionally moved along the X-Y plane (in the direction vertical of the optical axis of the measuring beam $L_M$). In accordance with the movement of the object 28 in the X-Y plane, the measuring beam $L_M$ of frequency $f_0$ is subjected to Doppler shift the amount ($\Delta f$) of which corresponds to an information on the surface profile of the object 28, such as fine roughness of the surface of the object 28. As a result of the Doppler shift, the frequency $f_0$ of the measuring beam $L_M$ is shifted by $\Delta f$ when the beam $L_M$ is reflected from the surface of the object 28. That is, the reflected beam $RL_M$ from the surface of the object 28 has a frequency ($f_0+\Delta f$). The surface profile of the object 28 is determined on the basis of the amount of the Doppler shift.

The reflected beam $RL_M$ is applied through the object lens 26 to the quarter-wave plate 24 and the plane of polarization of the beam $RL_M$ is rotated by 90° with respect to a going passage thereof, so that it is converted to a vertically-polarized light (S-polarized light) having an oscillating plane vertical to the drawing. The linearly-polarized beam $RL_M$ from the quarter-wave plate 24 is reflected from the PBS 22 to a half-wave plate 38 in which the linearly-polarized beam $RL_M$ is again converted to a plane-polarized (P-polarized) light having an oscillating plane parallel to the drawing. The plane-polarized light from the half-wave plate 38 is applied to an NPBS 40.

Figure 2:
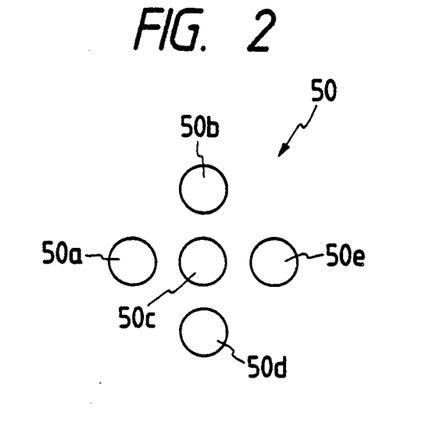
FIG. 2 shows an multisegmental optical sensor used in the surface profile measuring device as shown in FIG. 1.

The reference beam $L_R$ reflected from the NPBS 14 is applied to a pair of acoustooptic modulators 42 and 44 serving as optical frequency modulators for frequency-shifting an incident beam by $+f_1$ and $-f_2$, respectively. Accordingly, the frequency of the reference beam $L_R$ is changed from $f_0$ to $(f_0+f_1-f_2)$ when the beam $L_R$ is outputted from the pair of the acoustooptic modulators. The frequency-shifted reference beam $L_R$ is reflected by the reflection mirror 18 and is split into two beams by the NPBS 46. In the NPBS 20, one reference beam reflected from the NPBS 46 is composed with the measuring beam $L_M$ reflected from the NPBS, and the composite beam thus obtained is incident to an optical sensor 48 used for reference beat detection. On the other hand, in the NPBS 40 the other reference beam passed through the NPBS 46 is composed with the reflected beam $RL_M$ from the PBS 22, and the composite beam thus obtained is incident to a multisegmental optical sensor 50 used for measuring beat detection. The multisegmental optical sensor 50 comprises an optical sensor 50c positioned in the optical axis of the composite beam of the reflected beam $RL_M$ and the reference beam $L_R$ and four optical sensors 50a, 50b, 50d and 50e arranged in a plane vertical to the optical axis of the composite beam such that the four sensors 50a, 50b, 50d and 50e are positioned in the circumference of a circle at an angular interval of 90 while the sensor 50c is positioned at the center of the circle.

The optical sensor 48 detects beats which are caused by interference between the reference beam $L_R$ of frequency $(f_0+f_1-f_2)$ and the measuring beam $L_M$ of frequency $f_0$ and outputs a reference beat signal SR having a reference beat frequency $F_B$, where $f_B$ is equal to the difference in frequency between the reference and measuring beams, that is, an absolute value of $(f_1-f_2)$. The frequency shift values $(+f_1, -f_2)$ of the acoustooptic modulators 42 and 44 are beforehand set so that the reference beat frequency $f_B$ is, for example, about 100 kHz. Further, the optical sensors 50a to 50e of the multisegmental optical sensor 50 detect the beats caused by interference between the reference beam $L_R$ and the reflected beam $RL_M$, and output measuring beat signals SMa, SMb, SMc, SMd SMe, respectively. The measuring beat frequency $f_D$ of each of the measuring beat signals SMa to SMe is equal to the difference in frequency between the reference beam $L_R$ and the reflected beam $RL_M$, that is, an absolute value of $(F_B - \Delta f)$.

Figure 3:
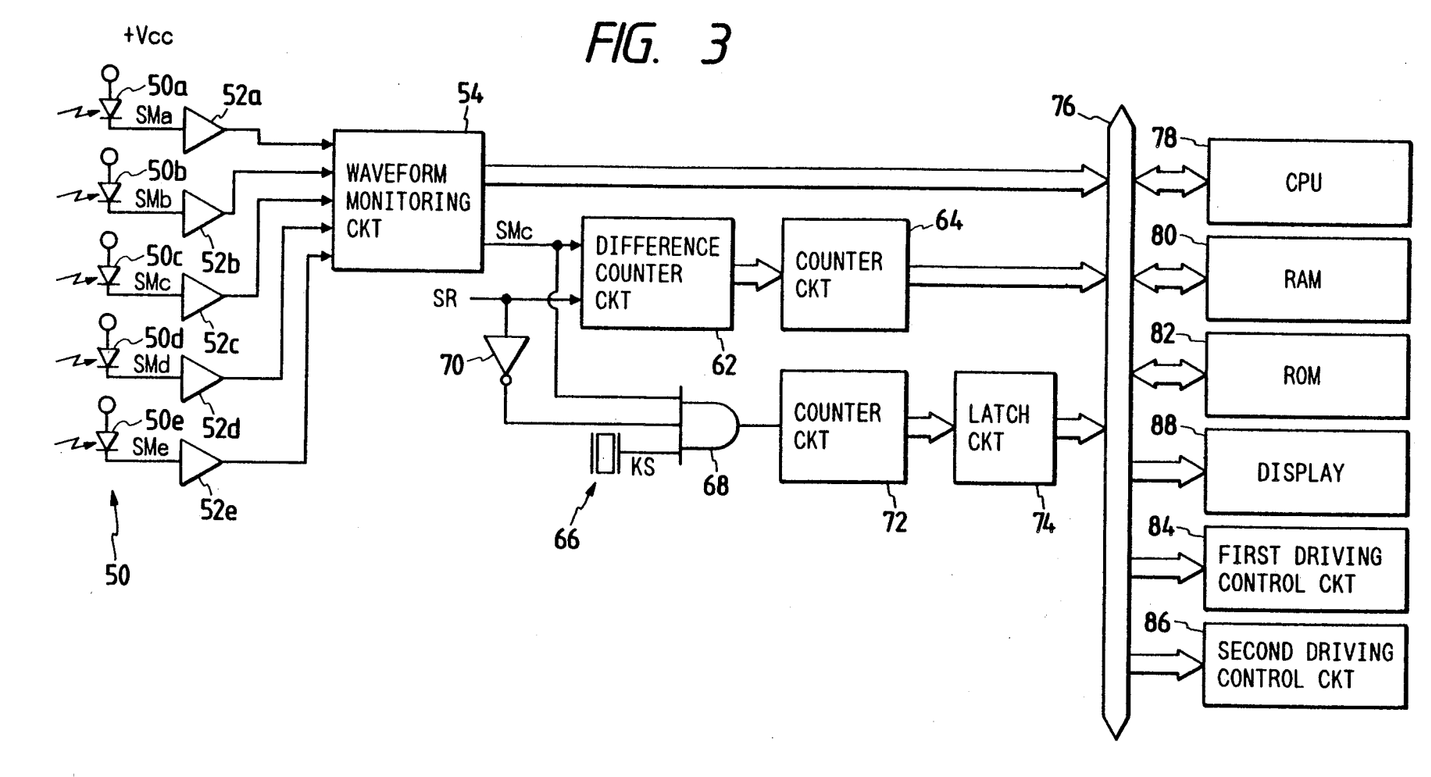
FIG. 3 is a block diagram showing a measuring circuit used in the surface profile measuring device as shown in FIG. 1.

FIG. 3 shows an embodiment of a measuring circuit used in the surface profile measuring device according to this invention. The measuring beat signals SMa to SMe outputted from the optical sensors 50a to 50e respectively are amplified by amplifiers 52a to 52e, respectively, and then is applied to a waveform monitoring circuit 54.

Figure 4:
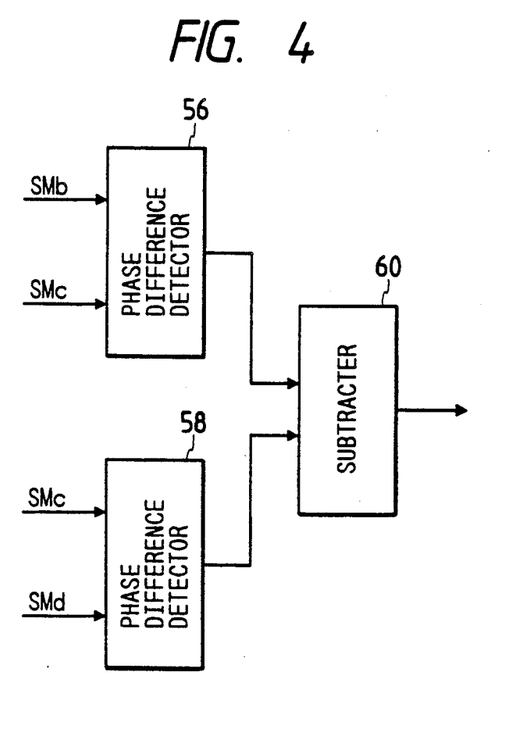
FIG. 4 is a block diagram showing a phase difference detecting circuit in a waveform monitoring circuit as shown in FIG. 3.

The waveform monitoring circuit 54 includes a phase difference detecting circuit as shown in FIG. 4, which comprises a phase difference detector 56 for detecting the phase difference ($\Phi$bc) between the measuring beat signals SMb and SMc, another phase difference detector 58 for detecting the phase difference ($\Phi$cd) between the measuring beat signals SMc and SMd, and a subtracter 60 for calculating the difference ($\Delta\Phi$) between the phase differences $\Phi$bc and $\Phi$cd. Each of the measuring beat signal SMc passed through the waveform monitoring circuit 54 and the reference beat signal SR outputted from the optical sensor 48 is shaped into a corresponding rectangular pulse in a shaping circuit (not shown) and then is applied to a difference counting circuit 62. The difference counting circuit 62 counts the difference between the number of beats $(C_D)$ of the measuring beat signal SMc and the number of beats $(C_B)$ of the reference beat signal SR in accordance with a timing signal supplied from a timing signal generator (not shown), and outputs the difference $(C_D - C_B)$ to a latch circuit 64 for temporally storing an input signal thereto. The reference beat signal SR and the measuring beat signal SMc which have been shaped into the rectangular pulses are supplied to an AND gate 68, together with a reference pulse signal KS having a constant clock frequency $f_C$ outputted from a quartz oscillator 66. The reference beat signal SR is applied through an inventer 70 to the AND gate 68. Accordingly, the number (C1) of the pulses of the reference pulse signal KS which have been passed through the AND gate 68 and counted by a counter circuit 72 corresponds to the phase difference between the reference beat signal SR and the measuring beat signal SMc, and a signal representing the number C1 is temporally stored in a latch circuit 74. The clock frequency fc of the reference pulse signal KS is set, for instance, about 100 MHz.

The difference $\Delta\Phi$ calculated by the waveform monitoring circuit 54, the measuring beat signal SMc supplied to the waveform monitoring circuit 54, the difference $(C_D - C_B)$ stored temporally in the latch circuit 64 and the pulse number C1 stored temporally in the latch circuit 74 are read out through a data bus line 76 by a CPU 78.

The CPU 78, a RAM 80 and a ROM 82 constitutes a microcomputer. The CPU 78 subjects an input signal thereto to a signal processing whose program is beforehand stored in the ROM 82 with the aid of a temporally-storing function of the RAM 80, and controls a first driving control circuit 84 to actuate the driving circuit 32 so that the object 28 to be measured is moved in the direction of the optical axis of the measuring beam $L_M$ and a second driving control circuit 86 to actuate the driving source 34 so that the movable table 36 is moved in the X- and Y-directions. The CPU 78 measures the surface profile of the object 28 on the basis of the difference $(C_D - C_B)$ and the pulse number C1 and controls a display 88 to display the measured result. The first driving control circuit 86 has, for example, a function of changing a voltage to be applied to the piezoelectric element.

Figure 5:
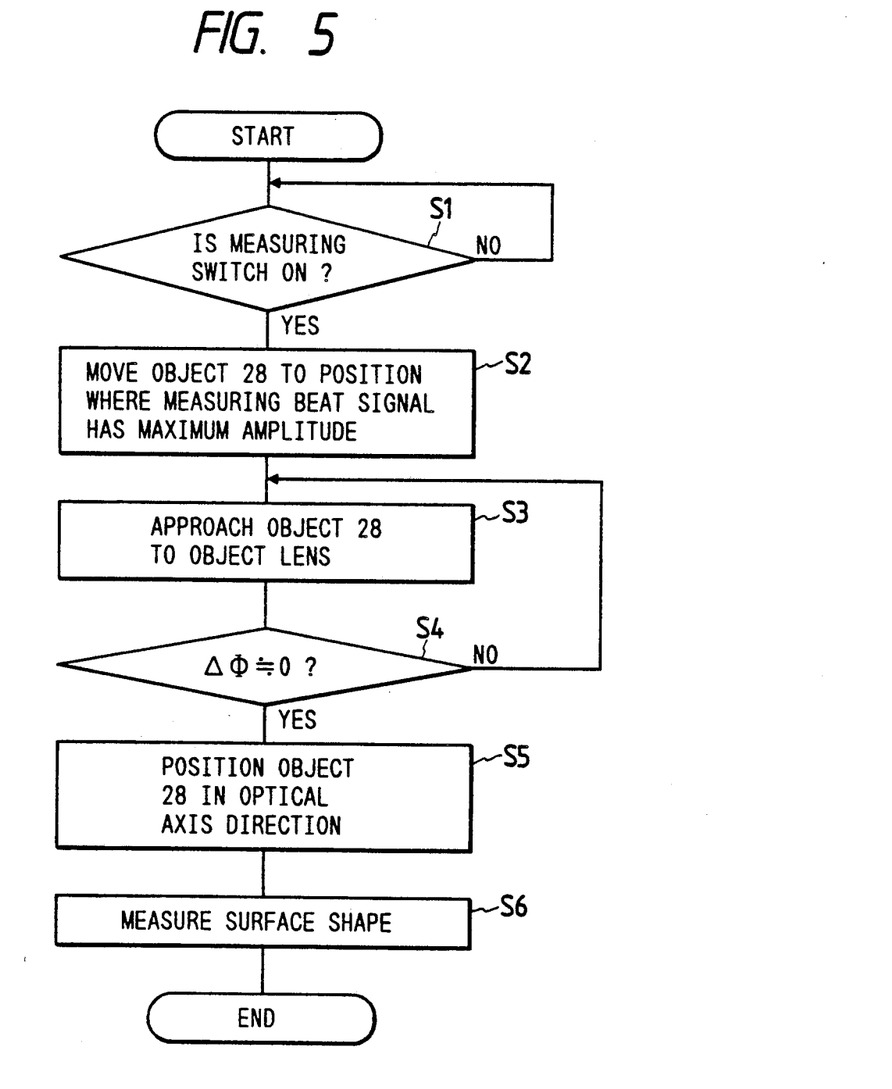
FIG. 5 is a flow chart for explaining the operation of the surface profile measuring device as shown in FIG. 1.

FIG. 5 shows a flow chart for the operation of this embodiment of the surface profile measuring device according to this invention.

Figure 6:
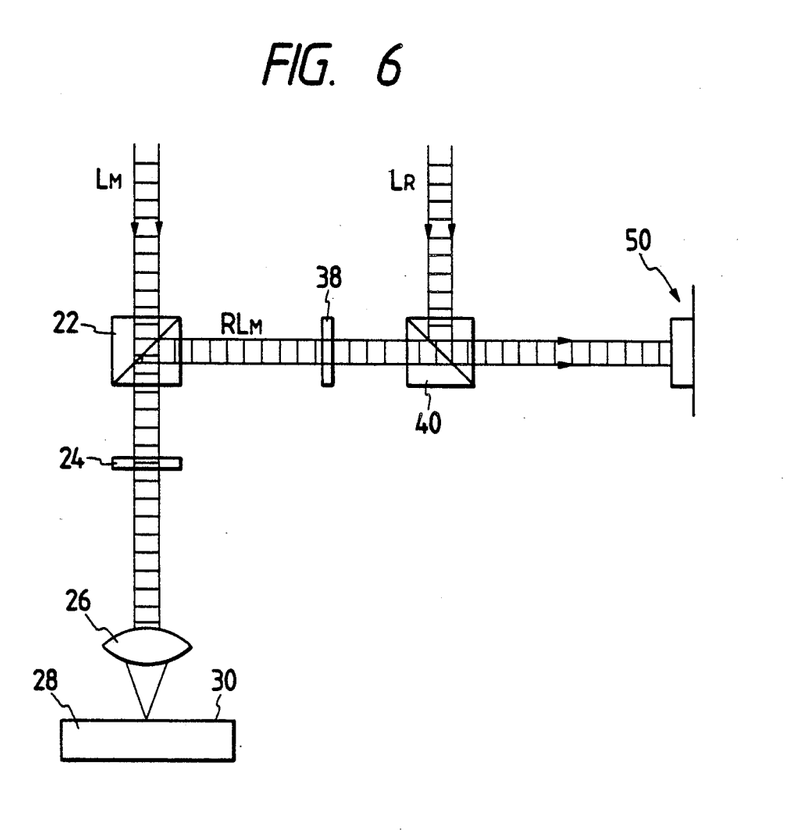
FIG. 6 is a schematical view for showing a case where the reflected beam from the surface of the object is a collimated beam in the surface profile measuring device as shown in FIG. 1.

First, a measuring switch (not shown) is switched to an ON state and a judgment in a step 1(S1) is "YES", so that a step 2(S2) is executed. In the step 2, the measuring beat signal SMc is read from the waveform monitoring circuit 54 to the CPU 78 and at the same time the driving control circuit 84 controls the driving device 32 to move the object 28 in the direction of the optical axis and dispose it so that the measuring beat signal SMc has the maximum amplitude (that is, light intensity to be detected by the optical sensor 50c is maximum), so that the object 28 is disposed at the position which provides the condition that the beam $RL_M$ reflected from the surface of the object is focused on a photosensing surface of the optical sensor 50 (in other words, the surface 30 of the object 28 is disposed a little far apart from the focusing position of the object lens 26). In the next step 3 (S3), the first driving control circuit 84 controls the driving device 32 to allow the object 28 to approach the object lens 26 and in the step 4 (S4) the difference ($\Delta\Phi$) is read from the waveform monitoring circuit 54 to judge whether or not the difference ($\Delta\Phi$) is equal to zero. The case where the difference ($\Delta\Phi$) is equal to zero corresponds to a case where the phase difference ($\Phi$bc) between the measuring beat signals SMb and SMc is equal to the phase difference ($\Phi$cd) between the measuring beat signals SMc and SMd, and means that the reflected beam $RL_M$ is a collimated beam, in other words, the surface 30 of the object 28 is disposed at the focusing position of the object lens 26. Accordingly, when the surface 30 of the object 28 is disposed at the focusing position of the object lens 26 , the reflected beam $RL_M$ is incident to the multisegmental optical sensor 50 as a collimated beam as shown in FIG. 6, so that the measuring beat signals SMa to SMe, which are obtained by interference between the reflected beam $RL_M$ and the reference beam $L_R$, are in phase because both of the reflected beam and the reference beam are collimated beams. In this case, since no phase difference occurs among the measuring beat signals, the phase differences $\Phi$bc, $\Phi$cd and the difference $\Delta\Phi$ are equal to zero.

Figure 7:
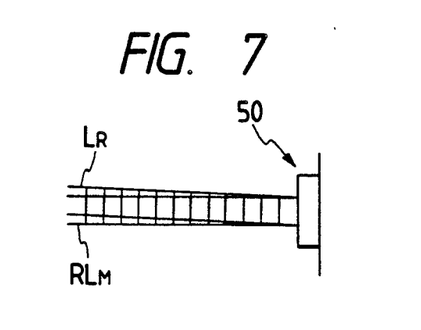
FIG. 7 is a schematical view for explaining a case where the optical axis of the reflected beam is slightly inclined to that of the reference beam.
Figure 8:
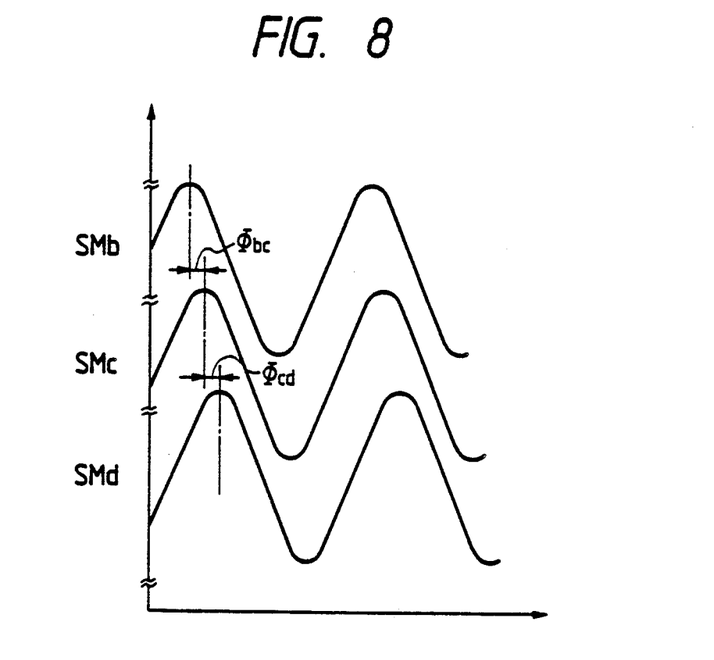
FIG. 8 is a graph for explaining phase difference between measuring beat signals outputted from three sensors of the multisegmental optical sensor.

When the optical axes of the reference beam $L_R$ and the reflected beam $RL_M$ are relatively inclined to each other as shown in FIG. 7, or the photosensing surface of the multisegmental optical sensor 50 is inclined to the optical axes of the beams $L_R$ and $RL_M$, the timing of interference between the reference beam $L_R$ and the reflected beam $RL_M$ at the position where each of the optical sensors 50a to 50e is disposed is different even if the reflected beam $RL_M$ is a collimated beam, and the phases of the measuring beat signals SMb, SMc and SMd are deviated from one another as shown in FIG. 8. However, the phase differences $\Phi$bc and $\Phi$cd are equal to each other because the multisegmental optical sensor 50 is designed such that the optical sensors 50b, 50c and 50d are aligned with one another and the distance between the optical sensors 50b and 50c is equal to that between the optical sensors 50c and 50d.

Figure 9:
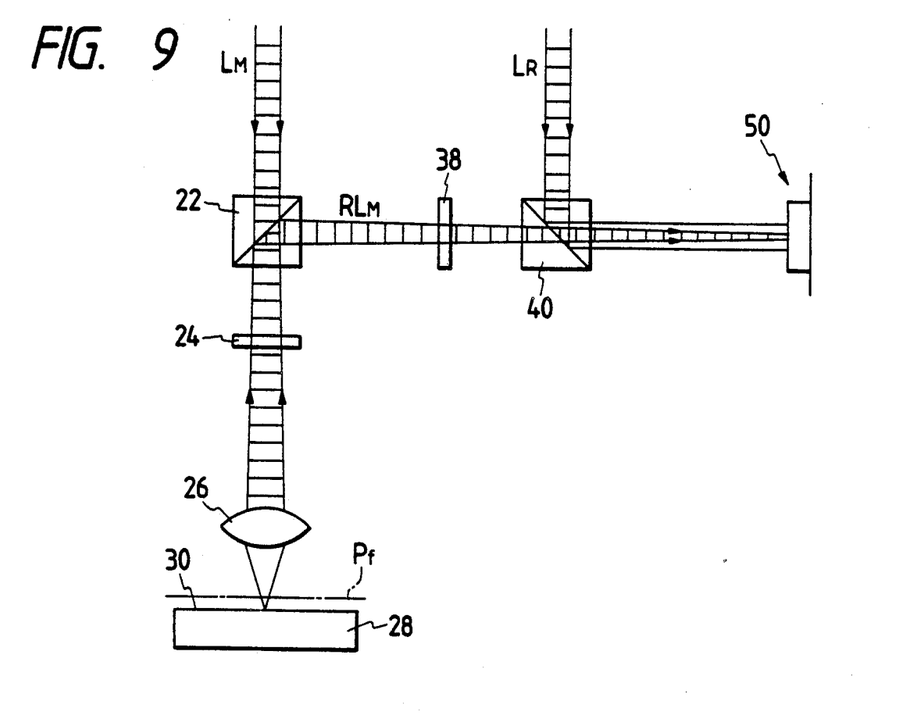
FIGS. 9 and 10 are schematical views showing a case where the reflected beam is convergently incident to the optical sensor.
Figure 10:
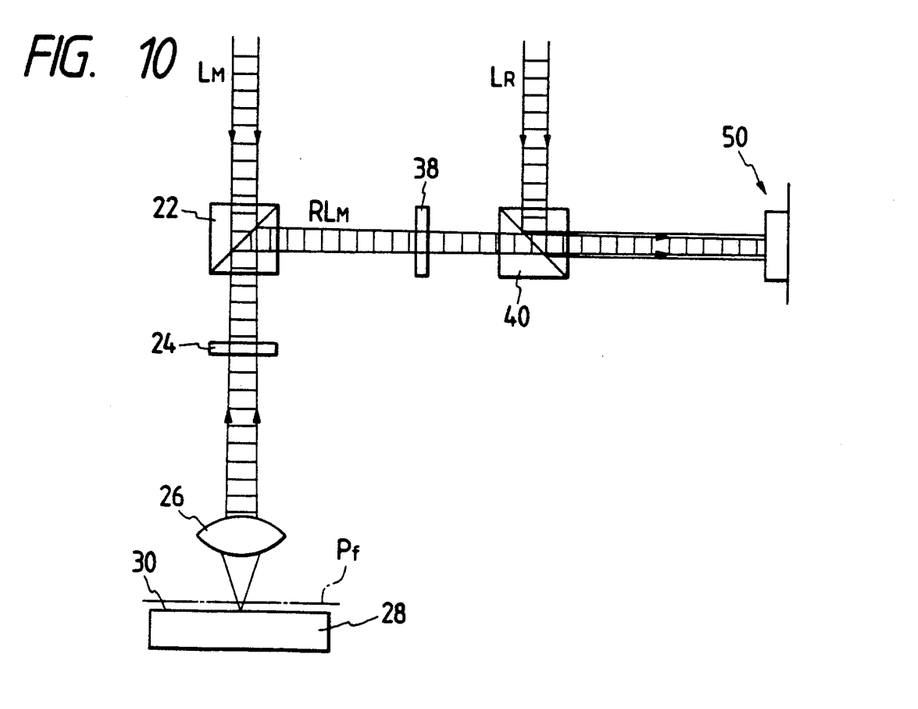
Figure 11:
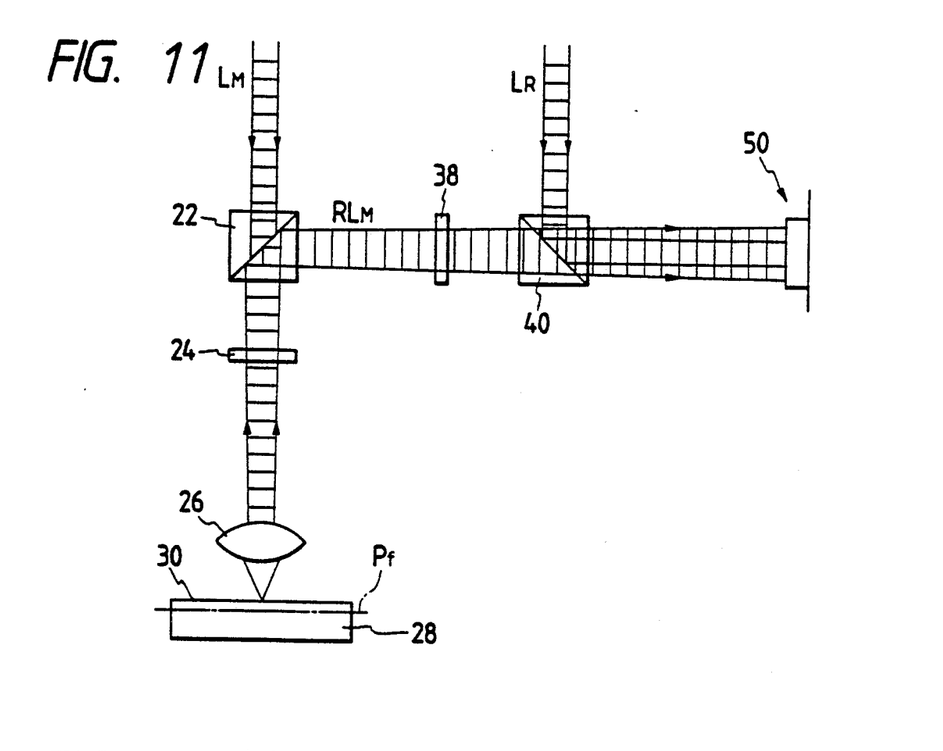
FIGS. 11 and 12 are schematical views showing a case where the reflected beam is divergently incident to the optical sensor.
Figure 12:
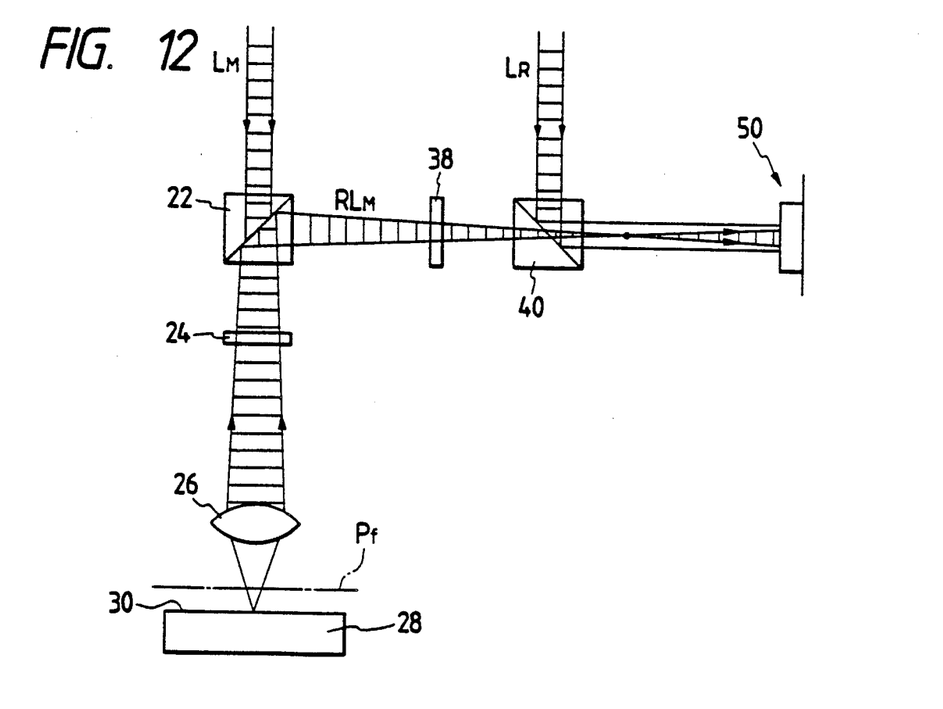

On the other hand, when the surface 30 of the object 28 is apart from the focusing position of the object lens 26, the reflected beam $RL_M$ is convergently incident to the multisegmental optical sensor 50 as shown in FIGS. 9 and 10, or it is divergently incident to the multisegmental optical sensor 50 as shown in FIGS. 11 and 12. Such convergent and divergent beams have a spherical wavefront, and therefore the measuring beat signals SMa, SMb, SMd and SMe obtained by the optical sensors 50a, 50b, 50d and 50e which are disposed apart from the optical sensor 50c are deviated in phase from the measuring beat signal SMc obtained by the optical sensor 50c. Since the optical sensors 50b and 50d are symmetrically disposed with respect to the optical sensor 50c, the phase difference between the measuring beat signals SMb and SMd is substantially equal to zero. Further, the phase difference $\Phi bc$ between the measuring beat signals SMb and SMc and the phase difference $\Phi cd$ between the measuring beat signals SMc and SMd are substantially equal to each other in absolute value, but are opposite to each other in sign.

In FIGS. 9 to 12, a chain line as indicated by Pf represents the focusing position of the object lens 26. FIG. 9 shows a case where the reflected beam $RL_M$ is convergently incident to the photosensing surface of the optical sensor 50c, in other words, a case where the object 28 is positioned so that the maximum amplitude is obtained for the measuring beat signal SMc in the step 2 (S2).

The operations of the step 3 (S3) and step 4 (S4) are repeated until the difference $\Delta\Phi$ is substantially equal to zero, and the step 5 (S5) is executed when the difference $\Delta\Phi$ is substantially equal to zero. In the step 5 (S5), the driving device 32 stops moving the object 28 in the direction of the optical axis, and disposes the object 28 at the position which is substantially coincident with the focusing position of the object lens 26. The positioning of the object 28 is performed, for example, by locking a voltage supplied to the piezoelectric element to a constant value. A constitutional element for executing the steps 2 to 5 (S2 to S5) in a series of signal processing which are executed by the CPU 78, RAM 80 and ROM 82 corresponds to a control device for controlling the driving device 32 so that the surface 30 of the object 28 is disposed substantially at the focusing position Pf of the object lens 26, and includes the multisegmental optical sensor 50, the waveform monitoring circuit 54, the first driving control circuit 84 and so on, which are required for executing those steps.

Subsequently to the step 5 (S5), the step 6 (S6) is executed to allow the second driving control circuit 86 to actuate the driving source 34 so that the movable table 36 is moved in the X- and Y-directions. At the same time, the difference $(C_D-C_B)$ and the pulse number C1 are read out of the latch circuits 64 and 74 respectively, and on the basis of those data the surface profile of the object 28 such as roughness of the object 28 is measured. Assuming that a displacement amount of the surface 30 of the object 28 in the direction of the optical axis is $\Delta Z$, an amount of the Doppler shift $\Delta f$ is calculated from equation (1) on the basis of the formula of Doppler effect. Further, since a Doppler shift $\Delta f$ is also represented with $(f_D-f_B)$, a displacement amount Z1 is calculated with equation (2) and represented with the difference $(C_D-C_B)$. The equation (2) calculates the displacement amount Z1 on the basis of the variation of the beat frequency $f_D$ of the measuring beat signal $SM_C$, that is, the Doppler shift $\Delta f$. The variation of the beat frequency $f_D$ corresponds to a phase variation per unit time of the measuring beat signal SMc, which is measured under the condition that one phase ($2\pi$) variation is one unit for measurement. Accordingly, the displacement amount Z1 corresponds to a displacement amount measured under condition that $\lambda/2$ is one unit. The displacement amount Z2 corresponding to a displacement amount which is smaller than $\lambda/2$ is calculated with the pulse number C1 on the basis of an equation of optical heterodyne interference, that is, the displacement amount Z2 is calculated from equation (3f). Assuming that the reference beat frequency $f_B$ and the clock frequency fc are set to 100 kHz and 100 MHz, respectively, the displacement amount Z2 would be measured in an order of $\lambda/2000$. In the equations (1) to (3), V2 represents a displacement speed of the surface 30 in the direction of the optical axis of the measuring beam $L_M$ (in the direction of irregularity of the surface), and $\lambda$ represents the wavelength of the measuring beam $L_M$.

$$\Delta f = (2/\lambda) V_2 \qquad (1)$$
$$= (2/\lambda)(\Delta Z/\Delta t)$$

$$Z1 = (\lambda/2)\int(f_D - f_B)dt \qquad (2)$$
$$= (\lambda/2)(C_D - C_B)$$

$$Z2 = (\lambda/2)(f_B \, C1/fc) \qquad (3)$$

The total displacement amount $\Delta Z$ of the surface 30 of the object 28 due to movement of the movable table 36 is calculated by adding the displacements Z1 and Z2. This process is repeated every predetermined period to measure the surface profile, that is, the roughness of the surface 30. The measured surface profile is displayed on the display 88.

In the surface profile measuring device utilizing optical heterodyne interference as described above, the surface 30 of the object 28 is disposed at the focusing position Pf of the object lens 26 before measuring the surface profile of the object 28, so that the reflected beam $RL_M$ is incident to the multisegmental optical sensor 50 while it is collimated. Accordingly, the reflected beam $RL_M$ completely interferes with the collimated reference beam $L_R$, so that the fine surface profile of the object 28 can be measured with high accuracy.

In an Applicant's experiment for ascertaining the advantage of this invention, it was proved that measurements obtained by the surface profile measuring device according to this embodiment were constantly approximately equal to those obtained by a measuring method (ISO's method) which was defined by International Organization for Standardization (ISO), while measurements obtained by the conventional surface profile measuring device were smaller or larger than those by the ISO's method when the reflected beam $RL_M$ was a convergent beam or a divergent beam as shown in FIGS. 9 to 12. This difference was further ascertained in terms of the number of scanning lines between a peak and a valley of the surface profile displayed on the display 88. The number of the scanning lines for the collimated reflected beam $RL_M$ as shown in FIG. 6 is 57. On the other hand, those of the scanning lines for the convergent reflected beams $RL_M$ as shown in FIGS. 9 and 10 are 52 and 54, respectively (that is, those numbers are smaller than the number (57) for the collimated beam) and the divergent reflected beams $RL_M$ as shown in FIGS. 11 and 12 are 60 and 62, respectively (that is, those numbers are larger than the number (57) for the collimated beam). The above difference is caused by occurrence of an error of the measuring beat frequency $f_D$ due to spherical aberration because both of the convergent and divergent beams are spherical waves.

Figure 13:
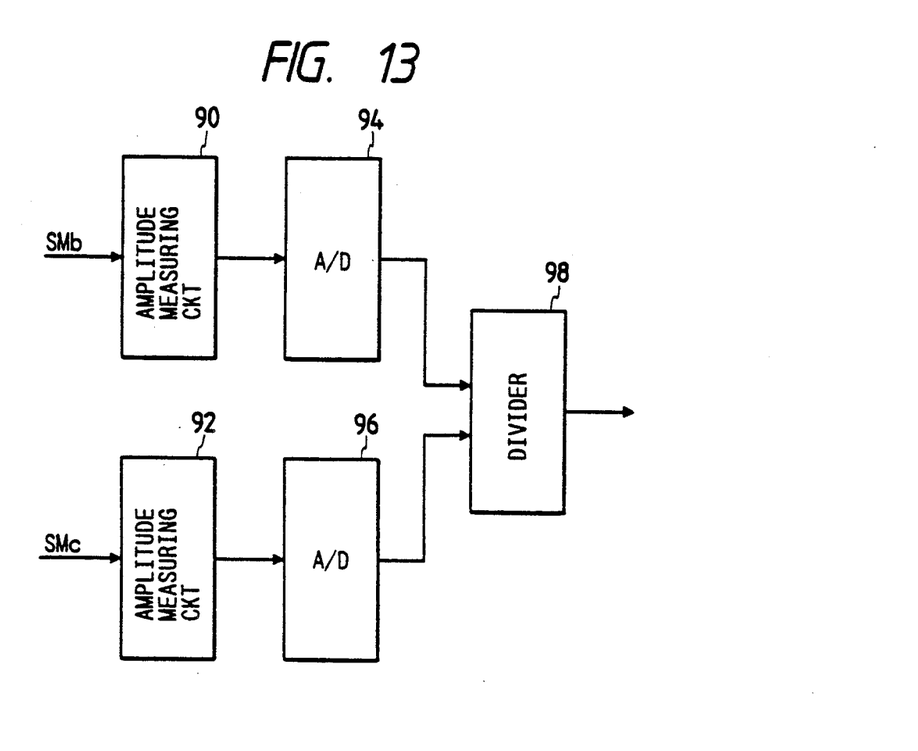
FIG. 13 is a block diagram showing an amplitude ratio detecting circuit of the waveform monitoring circuit, which corresponds to the block diagram of FIG. 4.

In place of the phase difference detecting circuit as shown in FIG. 4, an amplitude ratio detecting circuit as shown in FIG. 13 may be provided to the waveform monitoring circuit 54. The circuit comprises amplitude measuring circuits 90 and 92 for measuring the amplitudes of the beat signals SMb and SMc respectively (in other words, light intensities Ib and Ic detected by the optical sensors 50b and 50c), A/D (analog-to-digital) converters 94 and 96 for receiving signals indicative of the amplitudes of the beat signals SMb and SMc (light intensities Ib and Ic) and converting those signals into digital signals respectively, and a divider 98 for calculating a ratio of IC to Ib (Ic/Ib).

Figure 14:
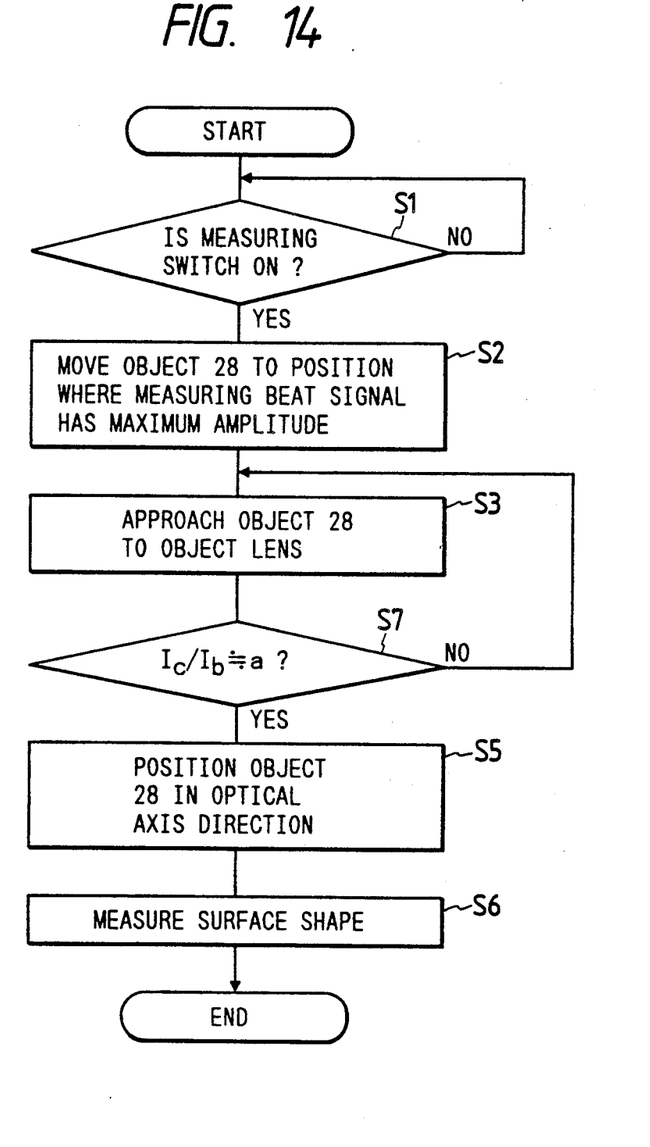
FIG. 14 is a flow chart for the operation of the surface profile measuring device utilizing the circuit as shown in FIG. 13.

FIG. 14 shows a flow chart for the operation of the surface profile measuring device using the circuit as shown in FIG. 13. The flow chart as shown in FIG. 14 are substantially identical to that as shown in FIG. 5, except for the step 4 (S4). The step 4 (S4) is substituted by a step 7 (S7). In the step 7, the ratio Ic/Ib is read out of the waveform monitoring circuit 54 by the CPU 78, and it is judged in the CPU 78 whether or not the ratio Ic/Ib is substantially equal to a predetermined value (a). The value (a) is beforehand set to the ratio Ic/Ib obtained in a case where, in consideration of a positional relation between the optical sensors 50b and 50c, the light intensity distribution of a composite beam of the reflected beam $RL_M$ and the reference beam $L_R$ is judged to be substantially coincident with the light intensity distribution of a laser beam L emitted from the laser source 10 within a plane vertical to the optical axis of the beam L (in this embodiment, Gaussian distribution). The case where the light intensity of the composite beam of the reflected beam $RL_M$ and the reference beam $L_R$ are substantially coincident with the Gaussian distribution means a case where like the laser beam L emitted from the laser source, the reflected beam $RL_M$ is a collimated beam, in other words, a case where the surface 30 of the object 28 is disposed at the focusing position of the object lens 26. Accordingly, in this embodiment, a control device for performing the steps 2, 3, 7, and 5 controls the driving device 32 so that a ratio Ib/Ic obtained in the waveform monitoring device 54 is substantially equal to the predetermined value (a) and therefore the surface 30 of the object 28 is disposed substantially at the focusing position Pf of the object lens 26. Through the above processes, this embodiment has the same effect as the surface profile measuring device using the circuit as shown in FIG. 4.

Figure 15:
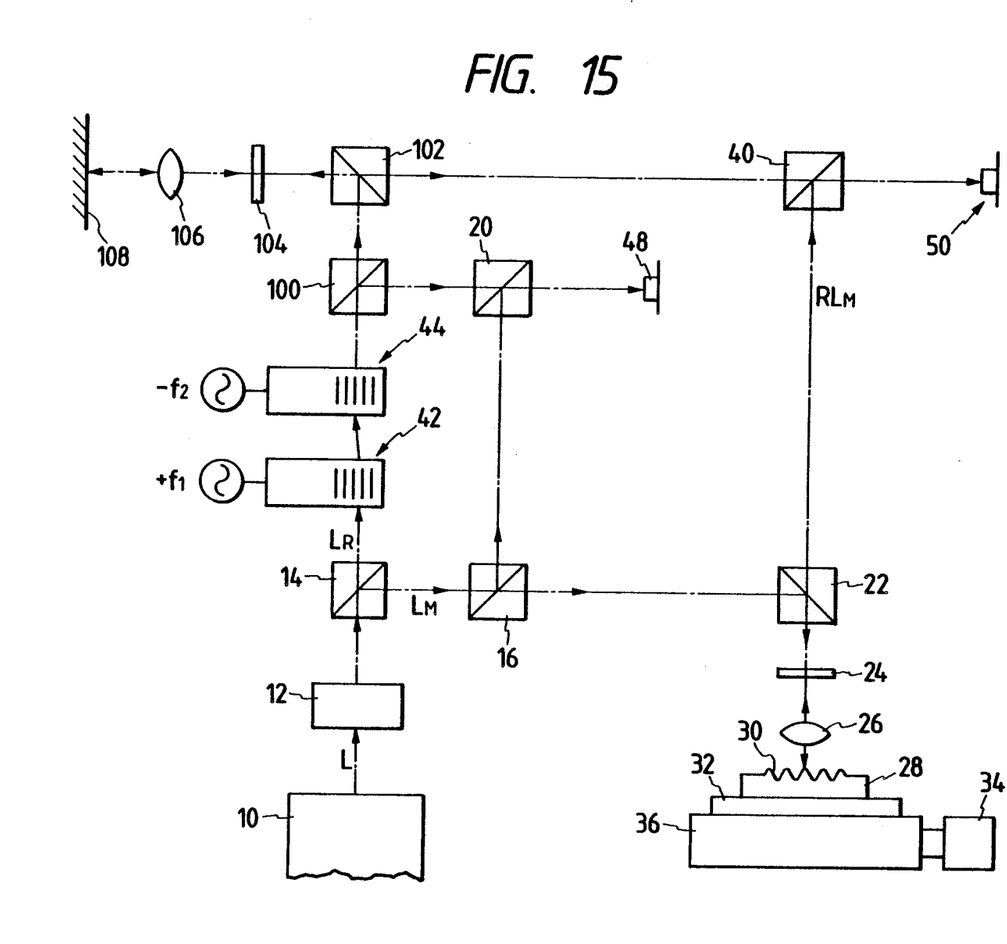
FIG. 15 shows another optical arrangement of the surface profile measuring device according to this invention.

FIG. 15 shows another optical arrangement of the surface profile measuring device according to this invention. The same elements as those in FIG. 1 are designated by the same reference numerals.

A S-polarized laser beam L whose plane of polarization is vertical to the drawing is emitted from the laser source 10, and then is applied through the isolator 12 to the NPBS 14. The reference beam $L_R$ which has been frequency-shifted by the acoustooptic modulators 42 and 44 is split into two beams in an NPBS 100, one passing through the NPBS 100 and the other beam being reflected therefrom. The reflected beam from the NPBS 100 and the measuring beam which is reflected from the NPBS 16 and used for forming a reference beat beam are applied to the optical sensor 48 used for reference beat detection. On the other hand, the reference beam $L_R$ passing through the NPBS 100 is reflected from a PBS 102 and then is circularly polarized in a quarter-wave plate 104. The circularly-polarized reference beam $L_R$ is focused through a focusing lens 106 on a reflection mirror 108 and reflected therefrom. The reflected beam is passed through the focusing lens 106 to the quarter-wave plate 104, in which the plane of polarization of the reflected beam is rotated by 90° with respect to the going passage thereof and therefore the reflected beam is linearly polarized (P-polarized). The P-polarized beam is passed through the PBS 102 and then is applied to the multisegmental optical sensor 50 for measuring beat detection, together with the reflected beam $RL_M$. The construction of a control circuit of this embodiment is substantially identical to those of the embodiments as described above.

This invention are not limited to the above embodiments. For example, the following modifications may be made to the embodiments as described above, (1) In place of moving the object 28, the object lens 26 may be moved in the direction of the optical axis.

(2) The surface profile of the object 28 is measured with the measuring beat signal SMc in the embodiments. However, it may be measured with one of the other signals SMa, SMb, SMd and SMe. Further, the positioning of the surface of the object 28 at the focusing position of the object lens is controlled on the basis of the difference $\Delta\Phi$ obtained from the measuring beat signals SMb, SMc and SMd in the first embodiment, or on the basis of the light intensity ratio Ib/Ic obtained from the measuring beat signals SMb and SMc in the second embodiment. However, it may be controlled on the basis of the difference $\Delta\Phi$ obtained from the other measuring signals, for example, SMa, SMc and SMe or on the basis of the light intensity ratio obtained from the other measuring beat signals. Still further, it may be controlled on the basis of the difference $\Delta\Phi$ or the light intensity ratio (amplitude ratio) obained from arbitrary or all measuring beat signals.

(3) The multisegmental optical sensor comprising circularly-arranged five optical sensors is used in the embodiments as described above. However, the number of the optical sensors is not limited to five, and the arrangement of the optical sensors are not limited to a circular shape. For example, a CCD sensor comprising plural optical sensors arranged in alignment with one another may be used. In this case, the light intensity distribution of a composite beam of the reflected beam $RL_M$ and the reference beam $L_R$ is more accurately obtained.

(4) In the embodiments as described above, the difference $\Delta\Phi$ and the light intensity ratio Ib/Ic is obtained by the waveform monitoring circuit 54. However, those data may be obtained through a signal processing of the CPU 78.

(5) In the embodiments as described above, the first driving control circuit 84 is controlled on the basis of the signals from the CPU 78. However, in place of the CPU 78, a circuit having the function of performing the operations of the steps 2 (S2) to 5

(S5) or the operations of the steps 2(S2), 3(S3), 7(S7) and 5(S5) may be provided to the waveform monitoring circuit 78 or the like.

(6) In the embodiments as described above, the position of the object 28 is adjusted on the basis of the measuring beat signal. However, it is possible that only the reflected beam $RL_M$ is detected by the multisegmental optical sensor or the like, and the object 28 is positioned on the basis of the light intensity ration of the reflected beam $RL_M$ or the like.

(7) In the embodiments as described above, the reference beat signal SR is outputted from the optical sensor 48 for reference beat detection. However, it may be obtained through driving frequency signals for driving the acoustooptic modulators 42 and 44.

(8) In the embodiments as described above, the acoustooptic modulators 42 and 44 are disposed in an optical passage of the reference beam $L_R$. However, it may be disposed in an optical passage of the measuring beam $L_M$ or the reflected beam $RL_M$.

(9) In the embodiments as described above, a pair of acoustooptic modulators 42 and 44 are used as an optical frequency shifter. However, the number of acoustooptic modulators and the kind of the optical frequency shifter are not limited thereto. For example, one or above three acoustooptic modulators or other optical elements may be used. Further, in place of the optical frequency shifter, a laser source for emitting a laser beam having two orthogonally polarized beams of slightly different frequency, such as a traverse Zeeman's laser or the like.

(10) In the embodiments as described above, the surface profile measuring device is designed so that only the measuring beam $L_M$ is incident to the surface 30 of the object 28. However, it may be designed so that the reference beam $L_R$ is applied to a relatively wide region of the surface 30, where the reference beam $L_R$ is not subjected to Doppler shift caused by a fine surface roughness, and then is subjected to optical heterodyne interference with the measuring beam $L_M$ which has been subjected to Doppler shift, thereby to measure the surface profile of the object.

(11) In the embodiments as described above, the measuring circuit is designed so that the displacement amount of the surface 30 is calculated from the frequency difference and phase difference between the measuring beat signal SMc and the reference beat signal SR. However, it may be freely designed in accordance with a measuring condition such as a measurement for surface roughness, for example, it may be designed so that the displacement amount is calculated from one of the frequency and phase differences.

As described above, any modification and improvement can be made to the embodiments as described above insofar as those is not deviated from the subject matter of this invention.

What is claimed is:

1. A surface profile measuring device utilizing optical heterodyne interference, comprising:
 a laser source for emitting a laser beam;
 an object lens for converging the laser beam on the surface of an object to be measured, the laser beam being reflected from the surface of the object while provided with information on a surface profile of the object;
 interfering means for allowing the reflected beam from the surface of the object to interfere with a reference beam having a frequency different from that of the reflected beam to form a composite beam of the reflected and reference beams;
 driving means for moving one of said object lens and the object relatively to the other in the direction of the optical axis of the laser beam incident on the surface of the object;
 control means for generating a beat signal having the information of the surface profile of the object from the composite beam and controlling said driving means on the basis of the beat signal so that the surface of the object is disposed substantially at a focusing position of said object lens;
 surface profile measuring means for measuring the surface profile of the object on the basis of phase variation of the beat signal.

2. A surface profile measuring device as claimed in claim 1, wherein said control means includes a specific optical sensor and plural optical sensors, each detecting the composite beam and generating a beat signal of the composite beam, and controls said driving means on the basis of the phase difference between the beat signals outputted from said optical sensors so that the reflected beam is a collimated beam.

3. A surface profile measuring device as claimed in claim 2, wherein said control means further includes a measuring circuit for measuring a first phase difference between the beat signal outputted from the specific optical sensor and each of at least the other two optical sensors, calculating a second phase difference between the measured first phase differences and judging as to whether the second phase difference is substantially to zero, and controls said driving means to move the surface of the object in the direction of the optical axis until the second phase difference is judged to be substantially to zero.

4. A surface profile measuring device as claimed in claim 1, wherein said control means includes plural optical sensors, each detecting the composite beam and generating a beat signal of the composite beam, and controls said driving means on the basis of the amplitude ratio between the beat signals outputted from said optical sensors so that the reflected beem is a collimated beam.

5. A surface profile measuring device as claimed in claim 4, wherein said control means further includes a mesuring circuit for measuring the amplitudes of the beat signals outputted from at least two optical sensors, calculating the ratio of the amplitudes and judging as to whether the calculated amplitude ratio is substantially equal to a predetermined value, and controls said driving means to move the surface of the object in the direction of the optical axis until the amplitude ratio is substantially equal to the predetermined value.

6. A surface profile measuring device as claimed in claim 1, wherein said interfering means includes a frequency shifter for receiving the laser beam emitted from said laser source and frequency-shifting the laser beam by a predetermined frequency, thereby forming the reference beam having a different frequency from that of the laser beam.

7. A surface profile measuring device as claimed in claim in 1, wherein said control means includes a multisegmental optical sensor for detecting the composite beam and generating beat signals of the composite beam, said multisegmental optical sensor comprising plural optical sensors arranged in the circumference of a circle at a predetermined angular interval and one optical sensor disposed at the center of the circle.

8. A surface profile measuring device as claimed in claim 1, wherein said driving means includes a piezoelectric element.

* * * * *